United States Patent
Wang et al.

(10) Patent No.: US 11,327,165 B2
(45) Date of Patent: May 10, 2022

(54) DISTANCE MEASUREMENT AND TRACKING POSITIONING APPARATUS AND METHOD FOR MOBILE DEVICE

(71) Applicant: COWA ROBOTIC CO., LTD., Shanghai (CN)

(72) Inventors: Qiang Wang, Shanghai (CN); Gangzhi He, Shanghai (CN); Tao He, Shanghai (CN); Wenlong Liao, Shanghai (CN); Jianfei Zhang, Shanghai (CN); Liyuan Liu, Shanghai (CN); Lei Zhao, Shanghai (CN)

(73) Assignee: COWA ROBOTIC CO., LTD., Shanghai (CN)

( * ) Notice: Subject to any disclaimer, the term of this patent is extended or adjusted under 35 U.S.C. 154(b) by 922 days.

(21) Appl. No.: 16/060,927

(22) PCT Filed: Jan. 20, 2016

(86) PCT No.: PCT/CN2016/071497
§ 371 (c)(1),
(2) Date: Nov. 11, 2018

(87) PCT Pub. No.: WO2017/096695
PCT Pub. Date: Jun. 15, 2017

(65) Prior Publication Data
US 2019/0072660 A1 Mar. 7, 2019

(30) Foreign Application Priority Data
Dec. 8, 2015 (CN) .......................... 201510901610.3

(51) Int. Cl.
*G01S 13/10* (2006.01)
*G01S 13/76* (2006.01)
(Continued)

(52) U.S. Cl.
CPC .............. *G01S 13/10* (2013.01); *G01S 7/295* (2013.01); *G01S 13/46* (2013.01); *G01S 13/765* (2013.01); *G01S 2013/9325* (2013.01)

(58) Field of Classification Search
CPC .. G01S 13/765; G01S 13/10–30; G01S 13/46; G01S 7/295; G01S 2013/9325; G01S 13/76
See application file for complete search history.

(56) References Cited

U.S. PATENT DOCUMENTS

| | | | | |
|---|---|---|---|---|
| 5,594,645 A | * | 1/1997 | Nishimura | ............ B60W 30/16 701/96 |
| 5,648,905 A | * | 7/1997 | Izumi | .................... G01S 13/931 701/301 |

(Continued)

*Primary Examiner* — Matthew M Barker

(57) ABSTRACT

The present invention provides an apparatus and a method for ranging, following and positioning of a mobile device. The apparatus includes an emitting unit, a receiving unit, and a computing unit. The emitting unit and the receiving unit are connected to the computing unit. The emitting unit is configured to emit a centimeter wave to an object to be followed. The receiving unit is configured to receive the centimeter wave. The computing unit is configured to calculate a distance between the mobile device and the object to be followed according to a time difference between emission of the centimeter wave and reception of the centimeter wave, and further calculate a movement distance according to the distance and a threshold distance difference. The present invention can be made waterproof and oil resistant. Compared with the technology using laser, the present invention better prevents measurement failure caused by permeability of the medium.

6 Claims, 3 Drawing Sheets

(51) Int. Cl.
*G01S 13/46* (2006.01)
*G01S 7/295* (2006.01)
*G01S 13/931* (2020.01)

(56) References Cited

U.S. PATENT DOCUMENTS

| | | | | |
|---|---|---|---|---|
| 5,695,020 A | * | 12/1997 | Nishimura | B60K 31/0008 |
| | | | | 180/169 |
| 5,749,426 A | * | 5/1998 | Gilling | B60W 30/16 |
| | | | | 180/167 |
| 6,169,478 B1 | * | 1/2001 | Hada | G01S 13/931 |
| | | | | 340/435 |
| 6,268,804 B1 | * | 7/2001 | Janky | G08G 1/164 |
| | | | | 340/903 |
| 7,400,290 B2 | * | 7/2008 | Woodington | G01S 13/528 |
| | | | | 342/84 |
| 2007/0164896 A1 | * | 7/2007 | Suzuki | G01S 7/0232 |
| | | | | 342/70 |
| 2012/0087418 A1 | * | 4/2012 | Zheng | H04J 3/0682 |
| | | | | 375/259 |

\* cited by examiner

DISTANCE MEASUREMENT AND TRACKING POSITIONING APPARATUS AND METHOD FOR MOBILE DEVICE

CROSS REFERENCE OF RELATED APPLICATION

This is a U.S. National Stage under 35 U.S.C 371 of the International Application PCT/CN2016/071497, filed Jan. 20, 2016, which claims priority under 35 U.S.C. 119(a-d) to CN 201510901610.3, filed Dec. 8, 2015.

BACKGROUND OF THE PRESENT INVENTION

Field of Invention

The present invention relates to the field of microwave measurement, and in particular, to an apparatus and a method for ranging, following and positioning of a mobile device.

Description of Related Arts

With the development of microwave wireless communication technology, wireless ranging becomes more precise, and the measurement method based on the microwave technology has begun to enter the mass consumer product industry.

According to the method of measuring time, electromagnetic wave ranging is divided into two major categories: pulse-based ranging and phase-based ranging. In ordinary consumer-grade products, phase-based ranging has a lower price to performance ratio than the pulse-based ranging. Common pulse-based ranging includes clock pulse, electronic gate, trigger, pulse emission, reflector, pulse reception, and count display. The basic principle is as follows: a narrow pulse emitted by a laser reaches a reflection unit and a receiving unit; a part of the pulse reaching the receiving unit is used as a reference signal, and a part of the pulse that is reflected by the reflection unit and then received by the receiving unit is used as a ranging signal; a time difference between the reference signal and the ranging signal is calculated, which may be converted to obtain a distance value. However, the ordinary pulse-based ranging instrument generally has a long ranging distance and poor precision. In the field of movable ranging and following, the ordinary pulse-based ranging instrument has a more fatal weakness, namely, the carrier is a laser beam, and it is limited in the following aspects:

1. Ranging is severely disturbed in daylight conditions.
2. Relative position requirements of the reflection unit and the receiving unit limit its application in the field of mobile devices.
3. The laser may cause serious harm to the human body (especially the eyes).
4. The laser is greatly affected by the surrounding environment during emission and reflection.

SUMMARY OF THE PRESENT INVENTION

In view of the defects in the prior art, an objective of the present invention is to provide an apparatus and a method for ranging, following and positioning of a mobile device.

According to the present invention, an apparatus for ranging, positioning and positioning of a mobile device includes an emitting unit, a receiving unit, and a computing unit; wherein:

the emitting unit and the receiving unit are connected to the computing unit; the emitting unit is configured to emit a centimeter wave to an object to be followed;

the receiving unit is configured to receive the centimeter wave; and the computing unit is configured to calculate a distance between the mobile device and the object to be followed according to a time difference between emission of the centimeter wave and reception of the centimeter wave, and further calculate a movement distance according to the distance and a threshold distance difference.

Preferably, the emitting unit is a UWB (ultra-wide band) module;

the UWB module includes a first CPU (central processing unit), a pulse signal generator, a first local oscillator frequency generator, a mixer, a balanced to unbalanced converter, and a first antenna; wherein:

the first CPU is connected to a control end of the pulse signal generator, and an output end of the pulse signal generator and an output end of the first local oscillator frequency generator are connected to an input end of the mixer; an output end of the mixer is connected to an input end of the balanced to unbalanced converter; an output end of the balanced to unbalanced converter is connected to the first antenna;

the first CPU is configured to control the signal generator to convert a first digital signal outputted by the first CPU into a pulse signal;

the signal generator is configured to emit the pulse signal;

the first local oscillator frequency generator is configured to generate a first local oscillator frequency;

the mixer is configured to amplify the pulse signal and then mix the amplified pulse signal with the first local oscillator frequency to generate a to-be-emitted signal;

the balanced to unbalanced converter is configured to match an output impedance of the mixer with an impedance of the first antenna and perform balance conversion; and the first antenna is configured to emit the to-be-emitted signal, that is, the centimeter wave.

Preferably, the receiving unit includes a second antenna, a low-noise amplifier module, a second local oscillator frequency generator, a band-pass filter, an ADC (Analog to Digital Converter) module, and a second CPU; wherein:

an input end of the low-noise amplifier module is connected to the second antenna, and an output end of the low-noise amplifier module is connected to the second CPU through the second local oscillator frequency generator, the band-pass filter, and the ADC module in sequence;

the low-noise amplifier module is configured to amplify the centimeter wave received by the second antenna with low noise to generate an amplified signal;

the second local oscillator frequency generator is configured to generate a second local oscillator frequency and then mix the second local oscillator frequency with the amplified signal to generate a mixed signal;

the band-pass filter is configured to filter and amplify the mixed signal to generate a filtered amplified signal;

the ADC module is configured to convert the filtered amplified signal into a second digital signal; and the second CPU is configured to process the obtained second digital signal.

Preferably, the computing unit is an ARM (Advanced Reduced Instruction Set Computer Machine) or an FPGA (Field Programmable Gate Array).

Preferably, the computing unit is configured to calculate a distance between the mobile device and the object to be followed according to a time difference between the first digital signal and the second digital signal, and further calculate the movement distance according to the distance and the threshold distance difference.

Preferably, the apparatus further includes a motion control system; the motion control system is disposed on the mobile device; the computing unit is connected to the motion control system; and the motion control system is configured to drive the mobile device according to the movement distance so as to implement following and positioning of the mobile device.

According to the present invention, a method for ranging, following and positioning of mobile devices uses the above apparatus for ranging, following and positioning of the mobile device, and includes steps of:

(S1) an emitting unit of an apparatus A emitting a first centimeter wave signal;

(S2) a receiving unit of an apparatus B receiving the first centimeter wave signal emitted by the emitting unit of the apparatus A, and an emitting unit of the apparatus B emitting a second centimeter wave signal; and (S3) a receiving unit of the apparatus A receiving the second centimeter wave emitted by the emitting unit of the apparatus B, and then the emitting unit of the apparatus A emitting a third centimeter wave to the receiving unit of the apparatus B, wherein:

the apparatus A is an apparatus for ranging, following and positioning of one mobile device, and the apparatus B is an apparatus for ranging, following and positioning of another mobile device.

Preferably, there are multiple apparatuses B each of which having the receiving unit.

Preferably, a measurement precision of the computing unit of both the apparatus A and the apparatus B is less than or equal to 10 cm.

Preferably, a vector operation method of multiple objects is used between the apparatus A and the multiple apparatuses B.

Compared with the prior art, the present invention has the following beneficial effects:

1. The centimeter wave emitted by the present invention has extremely low power, and is harmless to the human body;

2. Since the present invention does not require a reflection unit as a laser pulse instrument does, the present invention can be used in a ranging, following and positioning system that moves fast;

3. The present invention can use multiple receiving units and emitting units, so the three-dimensional relative positions of multiple devices can be obtained precisely;

4. The present invention can be made waterproof and oil resistant, and compared with the technology using laser, the present invention better prevents measurement failure caused by permeability of the medium; and 5. The present invention has extremely low power, and can even be made into a disposable device.

BRIEF DESCRIPTION OF THE DRAWINGS

Other features, objectives, and advantages of the present invention will become more apparent by reading the following detailed description of the non-limiting embodiments with reference to the accompanying drawings.

DETAILED DESCRIPTION OF THE PREFERRED EMBODIMENT

Figure 1:
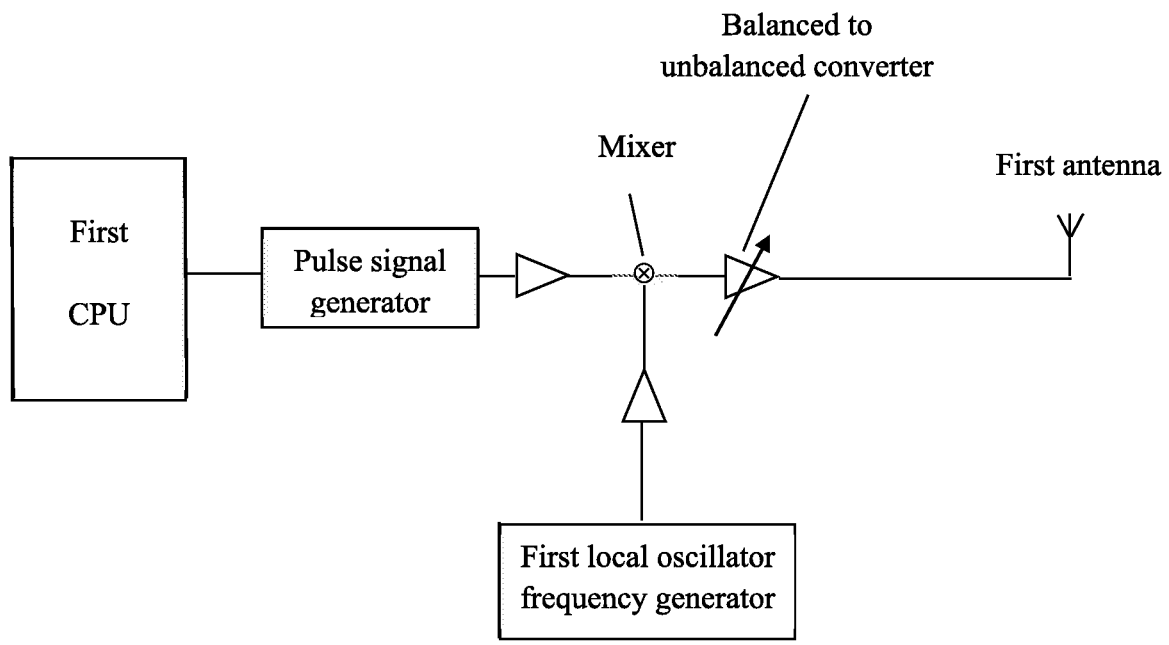
FIG. 1 is a schematically structural diagram of an emitting unit of the present invention.
Figure 2:
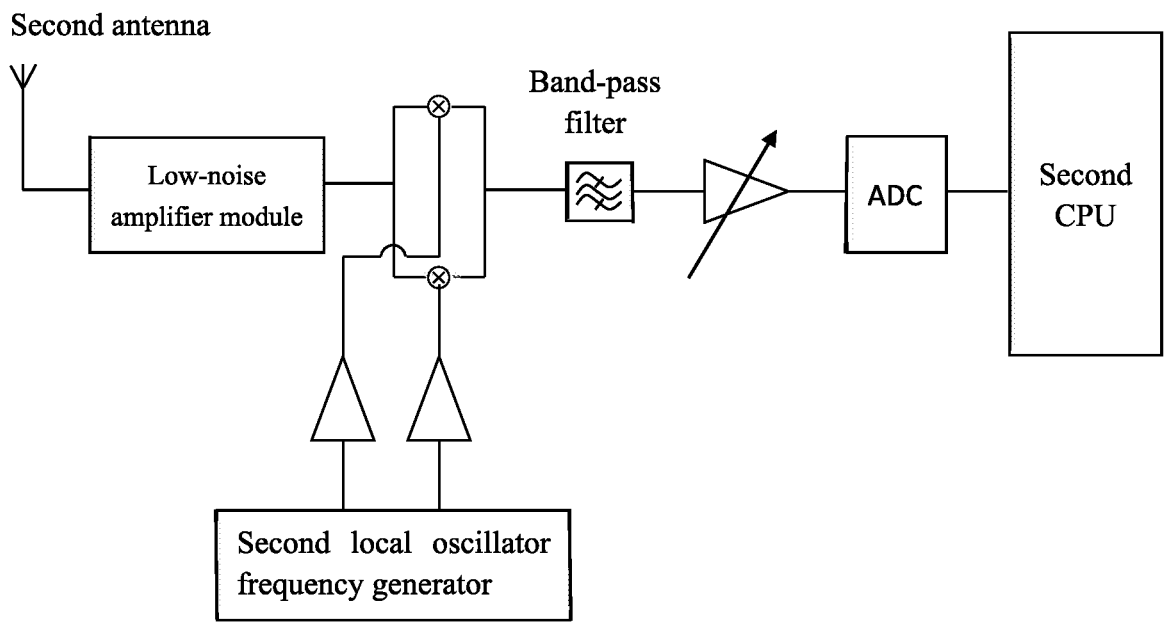
FIG. 2 is a schematically structural diagram of a receiving unit of the present invention.
Figure 3:
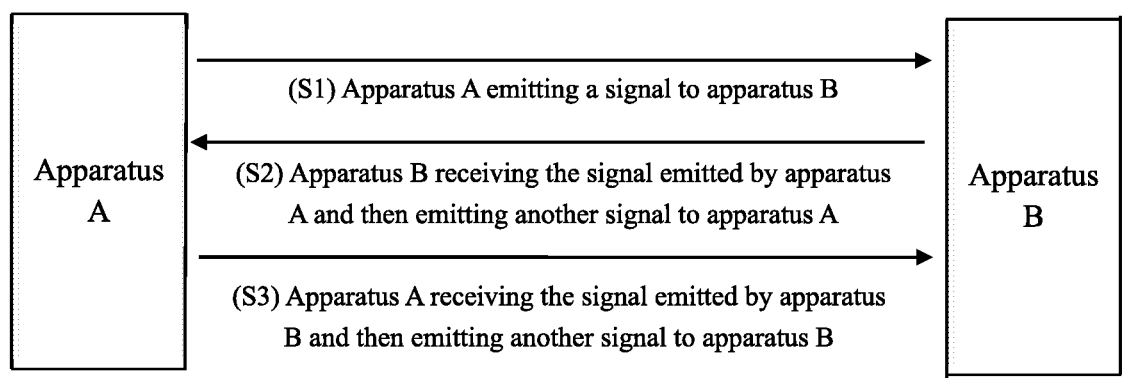
FIG. 3 is a flowchart of a method for ranging, following and positioning of a mobile device based on dual-device cooperation according to the present invention.
Figure 4:
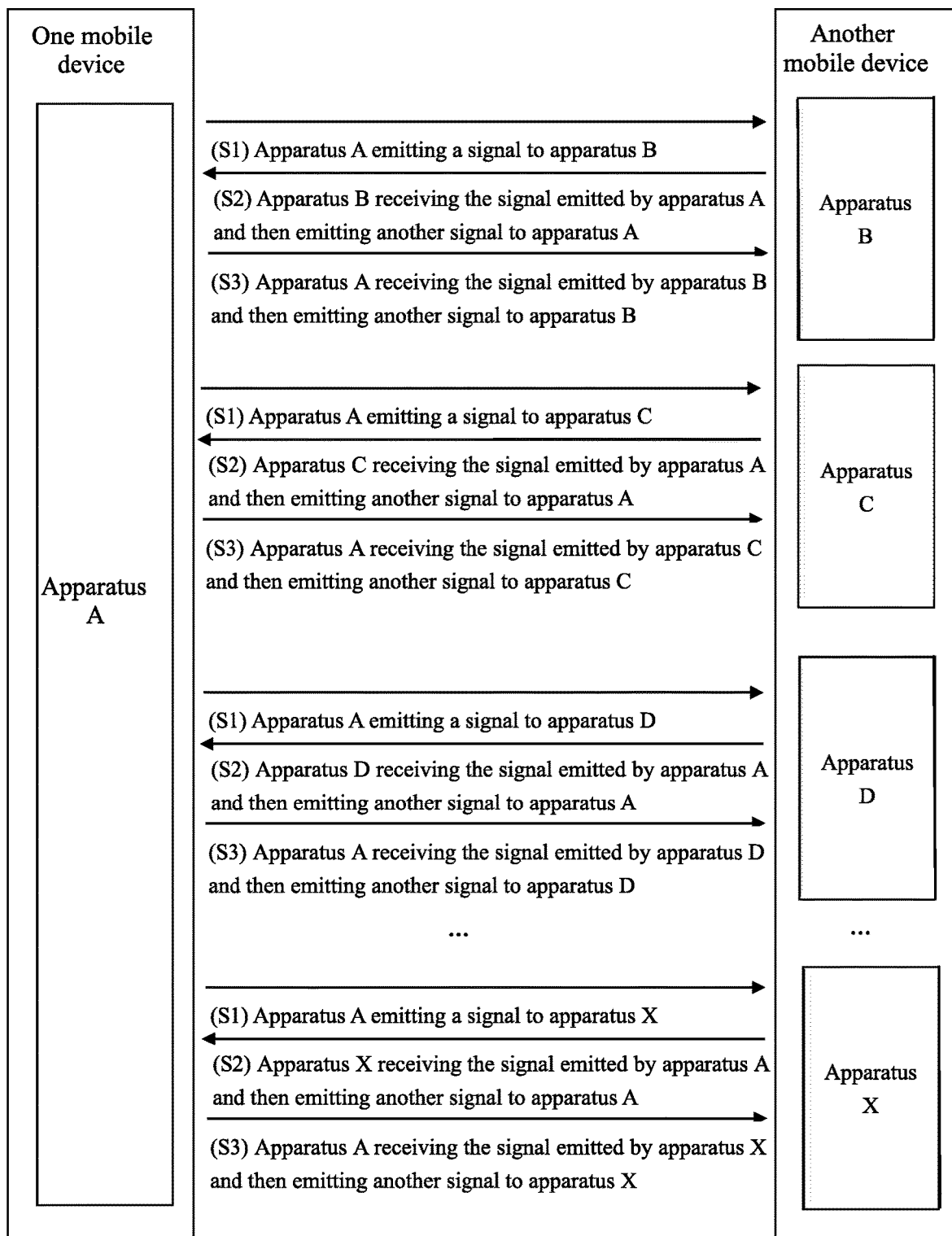
FIG. 4 is a flowchart of a method for ranging, following and positioning of a mobile device based on multi-device cooperation according to the present invention.

The present invention will be described in detail with reference to specific embodiments as follows. The following embodiments will help those skilled in the art further understand the present invention, but do not limit the present invention in any form. It should be noted that general technicians skilled in the art may make several variations and improvements without departing from the concept of the present invention. These are all within the protection scope of the present invention.

On the basis of the ordinary pulse-type ranging method, the present invention changes the carrier into a 4 GHz-6 GHz centimeter wave, and uses a one-emission multiple-reception mode to perform spatial vector positioning. The present invention achieves three-dimensional positioning and improves the precision of measurement. When the relative positions of two different objects are obtained, a relatively precise following function can also be achieved, which satisfies the requirements of the vast majority of consumer products, as well as the requirements of some industrial and military products.

In this embodiment, the apparatus for ranging, following and positioning of a mobile device provided by the present invention includes an emitting unit, a receiving unit, a computing unit, and a motion control system; wherein:

the emitting unit and the receiving unit are connected to the computing unit; the computing unit is connected to the motion control system; and the emitting unit is configured to emit a centimeter wave to an object to be followed;

the receiving unit is configured to receive the centimeter wave;

the computing unit is configured to calculate a distance between the mobile device and the object to be followed according to a time difference between emission of the centimeter wave and reception of the centimeter wave, and further calculate a movement distance according to the distance and a threshold distance difference; and the motion control system is configured to drive the mobile device according to the movement distance to implement following and positioning of the mobile device.

The emitting unit and the receiving unit may cooperate in two manners. One is to synchronize by an auxiliary signal, and the other is to cooperate independently. The basic principle of the synchronization using an auxiliary signal is that a CPU (central processing unit) of the emitting unit and a CPU of the receiving unit perform synchronization between emission and reception by the auxiliary signal. This manner increases the possible error of the measurement due to the introduction of the auxiliary signal, so the apparatus of the present invention does not use this manner.

The emitting unit is embodied as a UWB (ultra-wide band) module. The UWB module includes a first CPU, a pulse signal generator, a first local oscillator frequency generator, a mixer, a balanced to unbalanced converter, and a first antenna; wherein:

the first CPU is connected to a control end of the pulse signal generator, and an output end of the pulse signal generator and an output end of the first local oscillator frequency generator are connected to an input end of the mixer; an output end of the mixer is connected to an input end of the balanced to unbalanced converter; an output end of the balanced to unbalanced converter is connected to the first antenna;

the first CPU is configured to control the pulse signal generator to convert a first digital signal outputted by the first CPU into a pulse signal;

the pulse signal generator is configured to emit the pulse signal;

the first local oscillator frequency generator is configured to generate a first local oscillator frequency;

the mixer is configured to amplify the pulse signal and mix the amplified pulse signal with the first local oscillator frequency to generate a to-be-emitted signal;

the balanced to unbalanced converter is configured to match an output impedance of the mixer with an impedance of the first antenna and perform a balance conversion; and the first antenna is configured to emit the to-be-emitted signal, that is, the centimeter wave.

The UWB (Ultra-Wide Band) module is a centimeter wave emission module that is similar to a bracelet in size and conforms to the IEEE 802.15.4-2011 UWB standard. The UWB (Ultra-Wide Band) module includes a CPU and a radio frequency signal generator. The function of the UWB module is to emit power-adjustable amplitude modulation signals with the carrier in a range of 4G-6G.

The receiving unit includes a second antenna, a low-noise amplifier module, a second local oscillator frequency generator, a band-pass filter, an ADC (Analog to Digital Converter) module, and a second CPU; wherein: an input end of the low-noise amplifier module is connected to the second antenna, and an output end of the low-noise amplifier module is connected to the second CPU through the second local oscillator frequency generator, the band-pass filter, and the ADC module in sequence;

the low-noise amplifier module is configured to amplify the centimeter wave received by the second antenna with low noise to generate an amplified signal;

the second local oscillator frequency generator is configured to generate a second local oscillator frequency and mix the second local oscillator frequency with the amplified signal to generate a mixed signal;

the band-pass filter is configured to filter and amplify the mixed signal to generate a filtered amplified signal;

the ADC module is configured to convert the filtered amplified signal into a second digital signal; and the second CPU is configured to process the obtained second digital signal.

The computing unit is embodied as an ARM (Advanced Reduced Instruction Set Computer Machine) or an FPGA (Field Programmable Gate Array). The computing unit is configured to calculate the distance between the mobile device and the object to be followed based on the time difference between the first digital signal and the second digital signal, and further calculate the movement distance according to the distance and the threshold distance difference.

According to the present invention, a method for ranging, following and positioning of a mobile device uses the above apparatus for ranging, following and positioning of the mobile device, and includes steps of:

(S1) an emitting unit of an apparatus A emitting a first centimeter wave signal;

(S2) a receiving unit of an apparatus B receiving the first centimeter wave signal emitted by the emitting unit of the apparatus A, and then an emitting unit of the apparatus B emitting a second centimeter wave signal; and (S3) a receiving unit of the apparatus A receiving the second centimeter wave emitted by the emitting unit of the apparatus B, and then the emitting unit of the apparatus A emitting a third centimeter wave to the receiving unit of the apparatus B, wherein:

the apparatus A is an apparatus for ranging, following and positioning of a mobile device, and the apparatus B is an apparatus for ranging, following and positioning of another mobile device. The computing unit of the apparatus A or the apparatus B calculates a distance between the apparatus A and the apparatus B according to a time difference between the first centimeter wave and the second centimeter wave, or a time difference between the second centimeter wave and the third centimeter wave, and further calculate a movement distance according to the distance and a threshold distance difference.

There are multiple apparatus B each of which having the receiving unit. A measurement precision of the computing unit of both the apparatus A and the apparatuses B is less than or equal to 10 cm. A vector operation method of multiple objects is used between the apparatus A and the multiple apparatuses B.

The reception of the receiving unit of both the apparatus A and the apparatuses B is triggered very fast, and much faster than the propagation time, so ranging, following and positioning can be performed by calculating the flying time of the centimeter wave, and the measurement precision between the two apparatuses A and B is controlled within 10 cm. If the relative distance between the apparatus A and the apparatus B is set, the following function between different objects can be implemented by combining the apparatuses A and B with the motion control system.

The above describes the ranging, following and positioning between two apparatus. In order to improve the measurement precision and achieve three-dimensional spatial positioning at the same time, a vector operation method with multiple apparatuses is used to implement a high-precision ranging, following and positioning system based on one apparatus A and multiple apparatuses B.

The specific embodiments of the present invention have been described above. It should be understood that the present invention is not limited to the above specific embodiments, and those skilled in the art can make various variations or modifications within the scope of the claims, which do not affect the substance of the present invention.

What is claimed is:

1. An apparatus for ranging, following and positioning of a mobile device, comprising an emitting unit, a receiving unit, and a computing unit, wherein:

the emitting unit and the receiving unit are connected to the computing unit the emitting unit is configured to emit a centimeter wave to an object to be followed;

the receiving unit is configured to receive the centimeter wave;

the computing unit is configured to calculate a distance between the mobile device and the object to be followed according to a time difference between emission of the centimeter wave and reception of the centimeter wave, and further calculate a movement distance according to the distance and a threshold distance difference;

the emitting unit is a UWB (ultra-wide band) module; and the UWB module comprises a first CPU (central processing unit), a pulse signal generator, a first local oscillator frequency generator, a mixer, a balanced to unbalanced converter, and a first antenna, wherein: the first CPU is connected to a control end of the pulse signal generator, and an output end of the pulse signal generator and an output end of the first local oscillator frequency generator are connected to an input end of the mixer; an output end of the mixer is connected to an input end of the balanced to unbalanced converter; an output end of the balanced to unbalanced converter is connected to the first antenna;

the first CPU is configured to control the signal generator to convert a first digital signal outputted by the first CPU into a pulse signal;

the pulse signal generator is configured to emit the pulse signal;

the first local oscillator frequency generator is configured to generate a first local oscillator frequency;

the mixer is configured to amplify the pulse signal and then mix the amplified pulse signal with the first local oscillator frequency to generate a to-be-emitted signal;

the balanced to unbalanced converter is configured to match an output impedance of the mixer with an impedance of the first antenna and perform balance conversion; and the first antenna is configured to emit the to-be-emitted signal, that is, the centimeter wave.

2. The apparatus for ranging, following and positioning of the mobile device according to claim 1, wherein the receiving unit comprises a second antenna, a low-noise amplifier module, a second local oscillator frequency generator, a band-pass filter, an ADC (analog to digital converter) module, and a second CPU, wherein: an input end of the low-noise amplifier module is connected to the second antenna, and an output end of the low-noise amplifier module is connected to the second CPU through the second local oscillator frequency generator, the band-pass filter, and the ADC module in sequence;

the low-noise amplifier module is configured to amplify the centimeter wave received by the second antenna with low noise to generate an amplified signal;

the second local oscillator frequency generator is configured to generate a second local oscillator frequency and then mix the second local oscillator frequency with the amplified signal to generate a mixed signal;

the band-pass filter is configured to filter and amplify the mixed signal to generate a filtered amplified signal;

the ADC module is configured to convert the filtered amplified signal into a second digital signal; and the second CPU is configured to process the obtained second digital signal.

3. The apparatus for ranging, following and positioning of the mobile device according to claim 1, wherein the computing unit is an ARM (Advanced Reduced Instruction Set Computer Machine) or an FPGA (Field Programmable Gate Array).

4. The apparatus for ranging, following and positioning of the mobile device according to claim 2, wherein the computing unit is an ARM (Advanced Reduced Instruction Set Computer Machine) or an FPGA (Field Programmable Gate Array).

5. The apparatus for ranging, following and positioning of the mobile device according to claim 2, wherein the computing unit is configured to calculate the distance between the mobile device and the object to be followed according to a time difference between the first digital signal and the second digital signal, and further calculate the movement distance according to the distance and the threshold distance difference.

6. The apparatus for ranging, following and positioning of the mobile device according to claim 1, further comprising a motion control system, wherein the motion control system is disposed on the mobile device; the computing unit is connected to the motion control system; and the motion control system is configured to drive the mobile device according to the movement distance to implement following and positioning of the mobile device.

* * * * *